United States Patent
Hoppe

(10) Patent No.: US 6,822,350 B2
(45) Date of Patent: Nov. 23, 2004

(54) SECONDARY PART FOR LINEAR MOTOR WITH A COOLING SYSTEM

(75) Inventor: Thomas Hoppe, Schwabhausen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/480,028
(22) PCT Filed: Jun. 6, 2002
(86) PCT No.: PCT/EP02/06244
§ 371 (c)(1),
(2), (4) Date: Dec. 8, 2003
(87) PCT Pub. No.: WO03/003549
PCT Pub. Date: Jan. 9, 2003

(65) Prior Publication Data
US 2004/0164622 A1 Aug. 26, 2004

(30) Foreign Application Priority Data
Jun. 28, 2001 (DE) .......................... 101 31 118

(51) Int. Cl.$^7$ ............................................. H02K 41/00
(52) U.S. Cl. ......................................................... 310/12
(58) Field of Search ..................................... 310/12–14

(56) References Cited

U.S. PATENT DOCUMENTS

| | | | | |
|---|---|---|---|---|
| 3,801,843 A | * | 4/1974 | Corman et al. ................ 310/52 |
| 5,783,877 A | | 7/1998 | Chitayat ........................ 310/12 |
| 5,864,187 A | * | 1/1999 | Gonzalez ....................... 310/12 |
| 6,528,907 B2 | * | 3/2003 | Hwang et al. ................. 310/12 |
| 6,566,771 B1 | * | 5/2003 | Stoiber ......................... 310/12 |

FOREIGN PATENT DOCUMENTS

| DE | 199 36 064 A1 | 2/2001 | .......... H02K/41/02 |
|---|---|---|---|
| EP | 0 784 371 A | 7/1997 | .......... H02K/41/03 |
| EP | 0 868 012 A | 9/1998 | .......... H02K/41/02 |

* cited by examiner

Primary Examiner—Thanh Lam
Assistant Examiner—Judson H. Jones
(74) Attorney, Agent, or Firm—Henry M. Feiereisen

(57) ABSTRACT

The invention relates to a secondary part for a linear motor, comprising several permanent magnets (3) which are juxtaposed and embedded in a cast body (5) of plastic compound on a carrier plate (1). According to the invention, longitudinal grooves are provided alongside the juxtaposed permanent magnets (3) in the cast body (5) to receive cooling pipes (9). The grooves are preferably configured as undercut grooves and form locking means for securing the cooling pipes (9). The inventive measures are particularly useful for forming secondary parts from several juxtaposed secondary part elements, whereby single-piece cooling pipes can be used for all of the segments.

5 Claims, 1 Drawing Sheet

SECONDARY PART FOR LINEAR MOTOR WITH A COOLING SYSTEM

BACKGROUND OF THE INVENTION

The invention relates to secondary parts for linear motors, in particular synchronous linear motors.

Such linear motors include a primary part in which several coils are placed in linear arrangement, and a secondary part, in which several permanent magnets are placed in linear arrangement in accordance with the pole pitch measure of the primary part. The primary part is fed with electric energy and interacts with the secondary part via an air gap.

In operation, a portion of the electric energy in the primary part is converted into heat, and it is known to cool the primary part via cooling coils, whereby the cooling coils are normally attached on the coils-distal side of the primary part.

The secondary parts normally include a metallic carrier plate on which the permanent magnets are arranged, wherein the permanent magnets can be embedded in a casting compound (DE-A-19936064).

In operation, the secondary parts also heat up, whether as a result of electromagnetic interaction with the primary part, or whether as a result of heat radiation from the primary part onto the secondary part.

Although, it is possible to attach also a cooling pipe upon the metal plate of the secondary part; this, however, requires complicated assembly steps for securing the cooling pipe and possibly drilling and/or milling operations on the carrier plate.

SUMMARY OF THE INVENTION

It is therefore the object of the invention to provide a secondary part or a secondary part element for a linear motor, which can be provided in a simple manner with a cooling device.

This object can be attained by a secondary part element for a linear motor with a carrier plate for support of several permanent magnets, wherein the permanent magnets are embedded in a cast body upon the carrier plate, wherein the cast body has longitudinal grooves for receiving cooling pipes. According to another aspect of the invention, a secondary part includes several juxtaposed secondary part elements wherein the grooves are arranged in aligned relationship, and single-piece cooling pipes are received in the aligned grooves.

According to the invention, it is proposed to provide longitudinal grooves in the cast body of the secondary part for receiving the cooling pipes. These longitudinal grooves can be realized in a simple manner during casting of the secondary part, without requiring further finishing works upon the carrier plate of the secondary part.

The grooves extend hereby preferably at a depth up to the surface of the carrier plate in order to establish at least a mechanical contact between cooling pipes, which are placed into the grooves, and the surface of the carrier plate.

Preferably, the grooves have a cross section which corresponds at least partially to the cross section of the cooling pipes, and the grooves have undercuts so that the undercuts form locking means for the cooling pipes. In this case, the cooling pipes are only required to be "clasped" into the grooves, i.e. they snap into the grooves, without requiring additional fasteners.

The arrangement according to the invention is especially suitable for secondary parts which are composed of several secondary part elements. In this case, the grooves are arranged in aligned relationship, and single-piece cooling pipes can be placed in all grooves of the juxtaposed segments.

BRIEF DESCRIPTION OF THE DRAWING

An exemplified embodiment of the invention will now be described with reference to the attached drawings, in which.

DETAILED DESCRIPTION OF PREFERRED EMBODIMENTS

Figure 1:
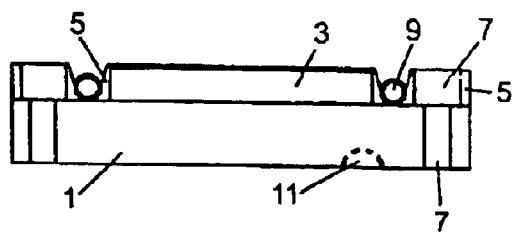
FIG. 1 shows a cross section of a secondary part element.
Figure 2:
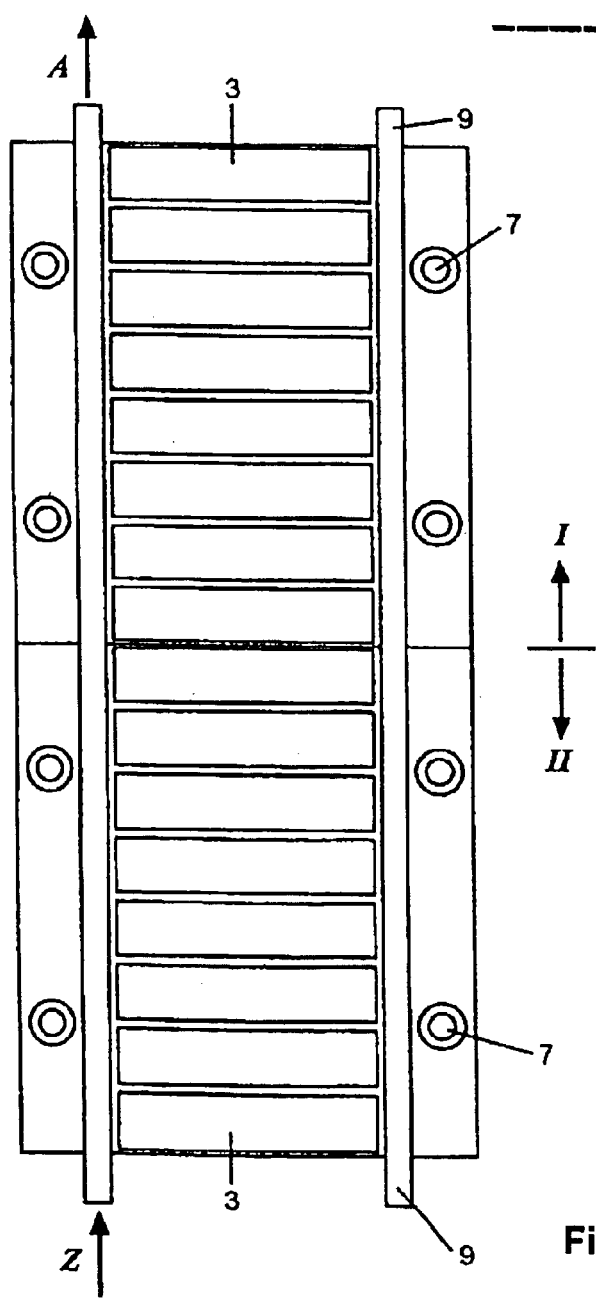
FIG. 2 shows a top view of a secondary part of two secondary part segments.

As shown in FIGS. 1 and 2, permanent magnets 3 are placed in linear arrangement in a manner known per se on a carrier element 1 of magnetizable material.

The permanent magnets 3 are cast in a cast body 5 cast onto the carrier plate 1, wherein the carrier plate is provided with fastening bores 7 for securement of the secondary part, and respective recesses 7' are provided in the cast body.

In the area between the recesses 7' and the permanent magnets 3, the cast body includes grooves which extend alongside the juxtaposed arrangement of the magnets along the secondary part elements. The longitudinal grooves are so configured as to form-fittingly receive cooling pipes 9 at least over a portion of its cross section.

Figure 1A:
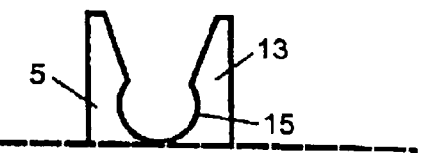
FIG. 1a shows a detailed cross section.

In the event of a round cross section for the cooling pipes 9, a possible configuration of the grooves is illustrated in FIG. 1a.

FIG. 1a shows hereby a partially circular groove 15 in the cast body 5 with undercuts 13.

As can be further seen from FIG. 1a, the groove has a depth which preferably extends up to the surface of the carrier plate 1, so that a cooling pipe, placed (snapped) into the groove, is in mechanical contact with the carrier plate at least linearly.

The arrangement according to the invention is especially suitable for secondary parts which are comprised of several secondary part elements. This is shown, in particular, in FIG. 2, which depicts two secondary part elements I, II. The secondary part elements are hereby arranged such that the grooves are aligned with one another, and subsequently, the cooling pipes are snapped into the grooves and held in place by the undercuts 13. Cooling is implemented by supplying coolant to the cooling pipes via an inlet Z, whereby the coolant passes by the secondary part elements I, II and exits via an outlet A.

Although the casting compound, such as polyurethane or epoxy resin, represents in principle a poor heat conductor, still, the proposed configuration has significant advantages compared to alternative solutions.

It could be conceivable to provide the bottom of the carrier plate 1 with recesses 11 for receiving cooling pipes. This, however, as stated above, requires cumbersome manipulations. Moreover, these recesses are arranged remote to the permanent magnets 3 and distal to the primary part as heat source; thus, heat has to pass the entire thickness of the carrier plate.

It is also conceivable to provide the fastening elements (not shown) with recesses 7', 7 to secure a cooling pipe. This, too, has the problem that the cooling pipe is arranged distal to the permanent magnets and to the heat source primary part, so that heat has to penetrate the carrier plate as well.

In contrast thereto, the invention ensures that the cooling pipes 9 are at least in linear contact with the carrier plate 1, namely directly next to the permanent magnets 3. Moreover, the grooves 15 are open toward the air gap so that the cooling pipes 9 are exposed in direction of the heat source primary part and thus are able to directly absorb heat radiation from the primary part.

What is claimed is:

1. A secondary part element for a linear motor, comprising
   a carrier plate; and
   a cast body supported on the carrier plate and having embedded therein plural permanent magnets, said cast body having longitudinal grooves adapted for receiving cooling pipes.

2. The secondary part element of claim 1, wherein the grooves have a depth extending up to a surface of the carrier plate.

3. The secondary part element of claim 1, wherein the grooves have undercuts.

4. The secondary part element of claim 3, wherein the undercuts have locking means.

5. A secondary part for a linear motor; comprising a plurality of secondary part elements placed juxtaposed to one another, each said secondary part element including a carrier plate, and a cast body supported on the carrier plate and having embedded therein plural permanent magnets, wherein the cast body has longitudinal grooves arranged in aligned relationship and adapted for receiving single-piece cooling pipes.

* * * * *